May 1, 1962   E. F. SCHMERL   3,032,131
ELEVATION ADJUSTABLE WEIGHING SCALE
Filed Dec. 7, 1954   2 Sheets-Sheet 1

INVENTOR.
EGON F. SCHMERL
BY
Bruce & Brosler
HIS ATTORNEYS

May 1, 1962 E. F. SCHMERL 3,032,131
ELEVATION ADJUSTABLE WEIGHING SCALE
Filed Dec. 7, 1954 2 Sheets-Sheet 2

INVENTOR.
EGON F. SCHMERL
BY
Bruce & Brosler
HIS ATTORNEYS

United States Patent Office 3,032,131
Patented May 1, 1962

3,032,131
ELEVATION ADJUSTABLE WEIGHING SCALE
Egon F. Schmerl, 20 Greenbank Ave., Piedmont, Calif.
Filed Dec. 7, 1954, Ser. No. 473,616
8 Claims. (Cl. 177—129)

My invention relates to weighing devices and more particularly to a platform type weighing scale.

The particular embodiments of the invention to be described are primarily for the purpose of weighing bed-ridden patients whose condition renders it difficult or dangerous for them to be lifted or moved about.

The determination of body weight and of its fluctuations has long gained clinical importance in cases of actual or impending electrolyte and water imbalance. It supplements laboratory data, and makes their interpretation easier, more accurate, more relevant, and more meaningful. It provides the clinical observer with objective information which may prove vital for proper and successful management.

In the postoperative state, it serves as a means of protecting against dehydration and even of anticipating it. To a certain degree, dehydration may elude the clinical observer, so may the insidious accumulation of fluid in the lungs long before edema becomes recognizable.

There are important fluid and electrolyte losses which cannot be measured directly but which can be discovered by repeated weighing of the patient. These are losses in sweat and vomitus which result not only in water but electrolyte deficiency. A fall in weight will promptly indicate such loss if it is greater than intake-output calculations indicate.

Well known are the difficulties which arise, sometimes to the despair of the physician, when it is found impossible to weigh the patient. Those that are bedridden, soporous, unconscious, in shock or in congestive failure, are the ones whose condition demands and at the same time ironically hinders the repeated procedures of weighing. Thus doctors are often handicapped in their efforts to gain insight into the elusive biochemical forces which set the stage for the clinical picture of electrolyte imbalance.

Among the objects of the present invention are:

(1) To provide a novel and improved weighing device;

(2) To provide a novel and improved weighing device having an adjustable weighing platform;

(3) To provide a novel and improved weighing device having a weighing platform adapted to extend above a surface occupying a lower plane;

(4) To provide a novel and improved weighing device having a weighing platform adjustable in elevation above a bed, mattress, or the like;

(5) To provide a novel and improved weighing device which is capable of weighing bedridden patients in a minimum of time and to the exclusion of the bed or any of its accessories such as mattress, pillows, sheets, of the like;

(6) To provide a novel and improved weighing device capable of weighing in-bed patients in a positive and direct manner without resorting to mathematical calculations as part of the weighing procedure;

(7) To provide a novel and improved weighing device for weighing in-bed patients which will perform its function with complete elimination of possible danger to the patient;

(8) To provide a novel and improved weighing scale for in-bed patients, the scale being entirely independent of the bed and capable of being readily maneuvered from one location to another;

(9) To provide a novel and improved weighing device capable of weighing in-bed patients, which device shall be compact and adapted for storage in a minimum of space;

(10) To provide a novel and improved weighing device which is not only capable of weighing in-bed patients, but is also applicable to the weighing of patients in a standing or sitting position.

Additional objects of my invention will be brought out in the following description of the same taken in conjunction with the accompanying drawings, wherein FIGURE 1 is a three dimensional view of one embodiment of the weighing device of the present invention;

Figure 1:
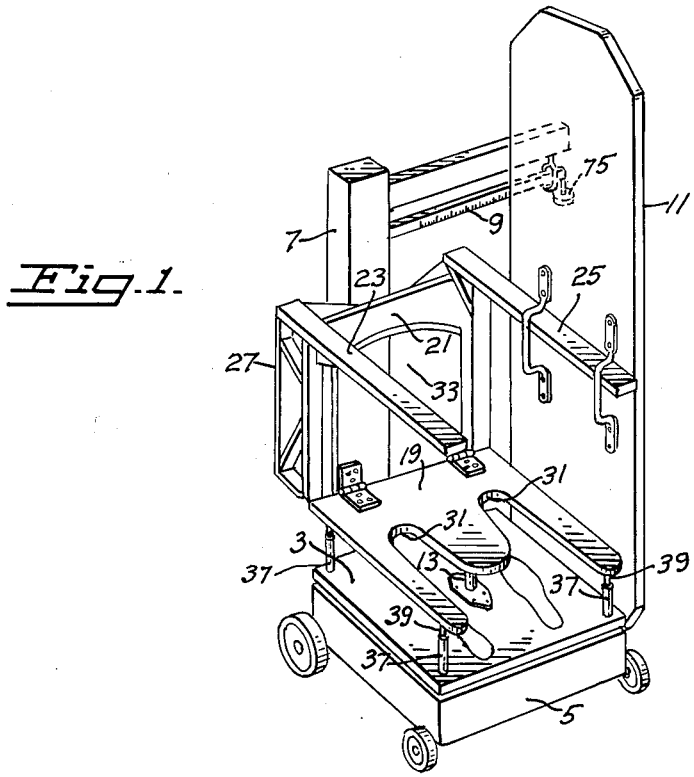
Figure 2:
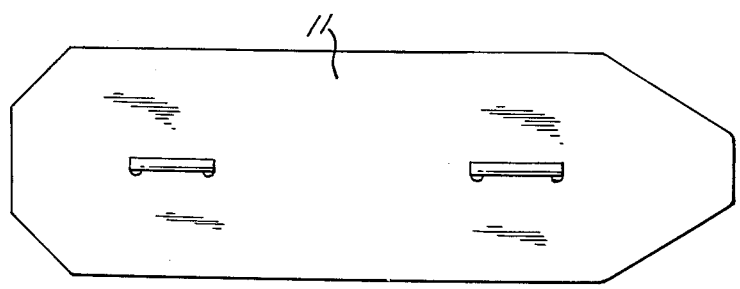
FIGURE 2 is a plan view of a weighing platform employed in the device of the present invention.
Figure 3:
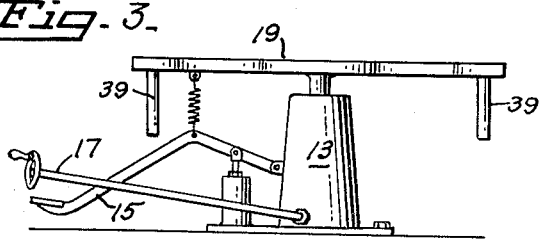
FIGURE 3 is a view in elevation depicting elevational adjusting means incorporated in the weighing device of FIGURE 1.

Referring to the drawings for details of my invention, the embodiment of FIGURE 1 represents the invention as utilizing as its weighing mechanism an existing well-known type of scale involving a platform 3 associated with the base 5 of the scale and coupled through an upright pillar 7 to a calibrated beam on which weight indications are registered. Such type of scale is so well known in the art as to require no further details as to its structure or mode of operation.

In utilizing such type of weighing mechanism to accomplish the objects of the present invention, an upper weighing platform 11 is adujstably mounted in space, on and above the original or what may now be designated the lower, platform of the scale, to permit the scale to be positioned with the upper platform above a surface occupying a lower plane. Insofar as the present contemplated application of the invention is involved, such surface may be the upper surface of the mattress in a bed occupied by a patient.

The adjustable mounting for such platform may involve an elevating mechanism such as a conventional type hydraulic jack 13 installed in the center of the lower platform of the weighing mechanism, such jack being provided with a foot lever 15 extending therefrom for pumping the jack to secure an elevational adjustment, and a valve release handle 17 for permitting the lowering of such jack to a position of lower elevation.

The jack carries an elevating frame including a baseboard 19, to the rear edge of which is rigidly affixed a vertical backboard 21, which in turn at its upper edge, supports a pair of laterally spaced, forwardly directed arms 23, 25 which are rigidly attached by suitable bracing 27 at the rear of the backboard.

The upper platform, when intended for use in the weighing of in-bed patients, will take the form of a board capable of receiving a person in prone position. This is supported across the forwardly directed arms. After the patient is turned on his side, the scale is shifted, to bring the platform over the mattress alongside the patient, and is then lowered onto the surface of the mattress. The patient may then be turned and settled upon the platform, following which, the platform is elevated slightly and the patient then weighed. Upon determining the patient's weight, the platform is again lowered to the mattress, and the patient removed therefrom to his position in the bed. The scale is then free to be withdrawn for use elsewhere.

The entire procedure necessitates but a minimum of handling of the patient, and may be completed in a brief few moments of time, with a minimum of discomfort or danger of injury to the individual.

The upper weighing platform is preferably hingedly or similarly secured to but one of the supporting arms, to thereby permit of its being tilted out of the way to a vertical position, with the lower end of this platform hanging alongside the elevating frame, to which it may, if desired, be removably secured, as by some form of clip.

In this position, it leaves the lower weighing platform available for weighing persons who are not bedridden but who are able to move about. In this connection, if the individual is capable of standing upon his own two feet, the lower platform may be made available for use by recessing the baseboard of the frame to, either side of the jack, to form recesses 31. Foot markings at proper locations on this platform, will serve as a guide to an individual using the scale in this manner.

For wheel chair patients and others too weak or incapable of being weighed in a standing position, provision is made for weighing them in a sitting position. For such purpose, a drop seat 33 is hingedly secured to the baseboard of the frame, adjacent the backboard, such seat being adapted to normally rest in an upright position against the backboard until desired for use.

It is to be noted, that regardless of which manner of weighing is resorted to, the dead weight on the weighing mechanism remains the same, thus retaining the zero adjustment of the weighing mechanism and eliminating any necessity for readjusting the same when the scale is used in the various ways indicated.

To increase the stability of the upper weighing platform and associated supporting frame, guide means is provided at each corner of the baseboard of the frame which may take the form of a guide tube 37 installed at each corner of the lower platform to receive a slidably fitted guide pin 39 correspondingly affixed to each corner of the baseboard of the frame.

Figure 4:
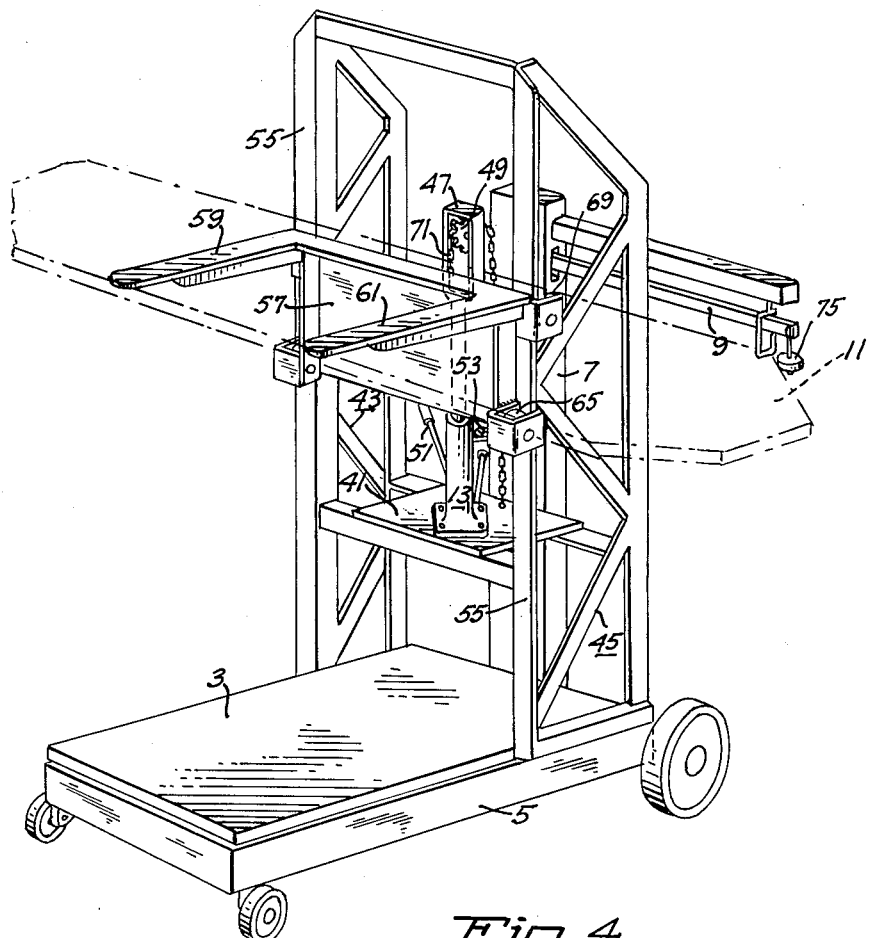
FIGURE 4 is a three dimensional view of a different embodiment of the invention but embodying the same fundamental principles.

A different embodiment of the invention and one which incorporates the basic fundamentals of the first embodiment described, is depicted in FIGURE 4. In this embodiment, the jack is removed from its central position on the lower platform of the weighing mechanism and is now supported on a shelf 41 carried between two reticulated side plates 43, 45 mounted on and toward the rear end of the lower platform.

The jack carries at its upper end, a housing 47 in which is journalled, a chain sprocket 49 whose elevational position is adapted to be altered through manipulation of the jack, by means of a pump handle 51 and a valve release handle 53, both extending to the rear of the scale.

Each reticulated side plate includes a front structural member 55 angle iron, which, together constitute a pair of rails adapted to slidably receive a carriage of which the weighing platform supporting arms constitute elements. Such carriage includes a cross plate 57 spanning these rails. From the upper end of this cross plate extend arms 59 and 61 which support the upper weighing platform.

Supported at each lower corner of the carriage plate to the front of the proximate rail is a roller 65 adapted to bear against the front face of the rail while from each of the upper corners of the carriage plate, the plate supports a roller 69 in contact with the rear surface of the proximate rail, thereby providing roller means for facilitating elevational movement of the carriage up and down the rails.

Such elevational adjustments are made possible through manipuation of the jack by a sprocket chain 71 connected at one end to the carriage and passing over the sprocket and terminating in a connection to a point on the shelf which carries the jack. Any adjustments of the jack will cause a corresponding rise or fall of the carriage with the upper weighing platform supported thereon. By reason of the mechanical advantage offered by the sprocket and chain arrangement, the carriage will move twice as far as the jack sprocket, thus affording quicker adjustments than are possible with the embodiment previously described.

Such arrangement, further, offers the decided advantage that the scale may be utilized with beds varying in height through a wide range, covering all known makes of hospital beds.

Inasmuch as the jack, in the second embodiment is always out from under the upper weighing platform, the lower platform will be available for weighing at all times when the upper platform is tilted to its vertical position. The scale structure, in this respect, thus becomes considerably simplified as compared to that of the previously described embodiment.

In connection with either of the foregoing scales, if an existing type commercial scale is employed as the basic structure, the super-structure added to create the scale of the present invention, may have its weight neutralized by a weight 75 suspended from the end of the calibrated beam. In this manner, the zero reading of the scale may be maintained.

From the foregoing description of my invention, it will be apparent that the same fulfills all the objects attributable thereto and while I have disclosed the same in two forms, the invention is subject to alteration and modification without departing from the underlying principles involved, and I accordingly do not desire to be limited in my protection to such details as have been illustrated and described, except as may be necessitated by the appended claims.

I claim:

1. A weighing scale comprising a lower weighing platform and an upper weighing platform, scale mechanism responsive to weight for providing an indication of such weight, means coupling said lower platform to said scale mechanism, and elevation adjusting means coupling said upper platform to said scale mechanism with sufficient clearance below said upper weighing platform to permit of positioning said upper platform above a surface occupying a lower plane such as the upper surface of a mattress in a bed and then elevationally adjusting said upper platform with respect to such surface, said elevation adjusting means including a pair of laterally spaced horizontally extending arms across which said upper weighing platform is supported.

2. A weighing scale comprising a weighing platform of a length and width to comfortably support a patient in prone position thereon, scale mechanism responsive to weight for providing an indication of such weight, and elevation adjusting means coupling said platform to said scale mechanism with sufficient clearance below said weighing platform to permit of positioning said weighing platform above a surface occupying a lower plane such as the upper surface of a mattress in a bed and then elevationally adjusting said platform with respect to such surface, said elevation adjusting means including a pair of laterally spaced horizontally extending arms across which said weighing platform is supported, and means hingedly securing said platform to one of said arms to permit tilting of said platform on said arm to a vertical position.

3. A weighing scale comprising an upper weighing platform of a length and width to comfortably support a patient in a prone position thereon, scale mechanism responsive to weight for providing an indication of such weight, said scale mechanism including a lower weighing platform, and elevation adjusting means coupling said upper platform to said scale mechanism with sufficient clearance below said upper platform to permit of positioning said upper platform above a surface occupying a lower plane such as the upper surface of a mattress in a bed and then elevationally adjusting said upper platform with respect to such surface, said elevational adjustable means including a pair of laterally spaced horizontally extending arms across which said upper weighing platform is supported, and means hingedly securing said upper platform to one of said arms to permit tilting of said upper platform on said arm to a vertical position.

4. A weighing scale comprising a lower weighing platform and an upper weighing platform, supported in spaced relationship above said lower weighing platform, said upper weighing platform being disposed transversely of said lower platform and of approximately the length of an individual to comfortably support such an individual in prone position, means responsive to weight placed upon either of said platforms for providing an indication of such weight, and means for tilting said upper weighing platform from its transverse position to substantially a vertical position to permit normal use of said lower platform for general weighing purposes without interference from said upper weighing platform.

5. Apparatus for elevating a bedridden patient with a minimum of disturbance, comprising a platform of a length and width to comfortably support a patient in prone position, a base having wheels, hydraulic load elevating means coupling said patient's platform to said base and including a pair of vertical side members on said base, a shelf interconnecting said side members, a patient's platform carrying means including a pair of forwardly extending interconnected arms slidably mounted on the front edges of said side members for vertical adjustment thereon, a hydraulic jack mounted on said shelf, a pinion carried by said jack at its upper end, a chain draped over said pinion and coupled at one end to said arms and at its other end to a fixed point on said load coupling means, and means tiltably securing said patient's platform to one of said arms.

6. Apparatus for weighing a bedridden patient with a minimum of disturbance, comprising a weighing platform of a length and width to comfortably support a patient in prone position, scale mechanism including a platform, hydraulic load elevating means coupling said patient's weighing platform to said scale mechanism and including a pair of vertical side members on said scale mechanism platform, a shelf interconnecting said side members, a patient's platform carrying means including a pair of forwardly extending interconnected arms slidably mounted on the front edges of said side members for vertical adjustment thereon, a hydraulic jack mounted on said shelf, a pinion carried by said jack at its upper end, a chain draped over said pinion and coupled at one end to said arms and at its other end to a fixed point on said load coupling means, and means tiltably securing said patient's weighing platform to one of said arms.

7. A weighing scale capable both of general utility and of weighing patients confined to bed, comprising a lower weighing platform for general weighing purposes, an upper platform adapted to receive an individual in prone position, means supporting said upper individual weighing platform in space above said lower weighing platform to enable supporting a patient in prone position above his normal position of rest in bed, when said lower platform is moved to a position beneath such bed, means in common with both said platforms and responsive to weight placed upon either for providing an indication of such weight, and means for displacing said upper platform from its position above said lower platform to a position on said scale permitting normal use of said lower weighing platform for general weighing purposes without interference from said upper weighing platform.

8. A weighing scale capable both of general utility and of weighing patients confined to bed, comprising a lower weighing platform for general weighing purposes, an upper platform adapted to receive an individual in prone position, means supporting said upper individual weighing platform in space above said lower weighing platform to enable supporting a patient in prone position above his normal position of rest in bed, when said lower platform is moved to a position beneath such bed, means for adjusting said upper weighing platform as to elevation following the placing of an individual thereon, means in common with both said platforms and responsive to weight placed upon either for providing an indication of such weight, and means for displacing said upper platform from its position above said lower platform to a position on said scale permitting normal use of said lower weighing platform for general weighing purposes without interference from said upper weighing platform.

References Cited in the file of this patent

UNITED STATES PATENTS

| | | |
|---|---|---|
| 236,579 | Harmon | Jan. 11, 1881 |
| 1,606,970 | Thomas | Nov. 16, 1926 |
| 1,804,299 | Yentsch | May 5, 1931 |
| 1,823,425 | Davis | Sept. 15, 1931 |
| 1,828,022 | Brand | Oct. 20, 1931 |
| 1,969,365 | Gilbert | Aug. 7, 1934 |
| 2,500,542 | Greene | Mar. 14, 1950 |
| 2,604,640 | Junkin | July 29, 1952 |
| 2,659,592 | Wetsel | Nov. 17, 1953 |
| 2,678,207 | Wheeler | May 11, 1954 |
| 2,722,411 | Philbrook | Nov. 1, 1955 |
| 2,823,911 | Murphy | Feb. 18, 1958 |

FOREIGN PATENTS

| | | |
|---|---|---|
| 16,210 | Great Britain | Sept. 12, 1900 |
| 148,807 | Switzerland | Oct. 16, 1931 |
| 135,977 | Germany | Dec. 27, 1933 |
| 411,294 | Great Britain | June 7, 1934 |
| 49,040 | Denmark | July 13, 1934 |

OTHER REFERENCES

Page 25 of a catalogue entitled "Aequitas Buscule Automatique" received in Patent Office Oct. 20, 1932.